United States Patent
Imbimbo et al.

(10) Patent No.: US 8,478,227 B2
(45) Date of Patent: Jul. 2, 2013

(54) SYSTEM AND METHOD FOR LAWFUL INTERCEPTION OF USER INFORMATION

(75) Inventors: Amedeo Imbimbo, Caivano (IT); Raffaele De Santis, Mercato San Severino (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1024 days.

(21) Appl. No.: 12/158,449

(22) PCT Filed: Dec. 22, 2005

(86) PCT No.: PCT/SE2005/002005
§ 371 (c)(1),
(2), (4) Date: Jul. 25, 2008

(87) PCT Pub. No.: WO2007/073252
PCT Pub. Date: Jun. 28, 2007

(65) Prior Publication Data
US 2008/0280609 A1    Nov. 13, 2008

(51) Int. Cl.
*H04M 11/04* (2006.01)
*H04W 4/00* (2009.01)

(52) U.S. Cl.
USPC .................................... 455/404.2; 455/435.1

(58) Field of Classification Search
USPC ............. 455/435.1, 404.1, 404.2, 456.1
See application file for complete search history.

(56) References Cited

U.S. PATENT DOCUMENTS

| | | | | |
|---|---|---|---|---|
| 6,122,499 A | * | 9/2000 | Magnusson | 455/405 |
| 6,131,032 A | * | 10/2000 | Patel | 455/445 |
| 6,141,548 A | * | 10/2000 | Blanchard et al. | 455/428 |
| 6,738,902 B1 | * | 5/2004 | Ruppert et al. | 713/162 |
| 6,754,834 B2 | * | 6/2004 | Miettinen et al. | 726/3 |
| 7,912,486 B2 | * | 3/2011 | Bantukul et al. | 455/466 |
| 2003/0101356 A1 | * | 5/2003 | Miettinen et al. | 713/201 |
| 2004/0095894 A1 | * | 5/2004 | Eloranta et al. | 370/252 |
| 2004/0243720 A1 | * | 12/2004 | Haumont et al. | 709/245 |
| 2005/0076117 A1 | * | 4/2005 | Hou et al. | 709/224 |
| 2005/0094651 A1 | * | 5/2005 | Lutz et al. | 370/401 |
| 2005/0152275 A1 | * | 7/2005 | Laurila et al. | 370/241 |
| 2007/0287428 A1 | * | 12/2007 | Diacakis et al. | 455/414.1 |

FOREIGN PATENT DOCUMENTS

WO    WO 0160098 A1    8/2001
WO    WO 2004/040929 A1    5/2004

* cited by examiner

*Primary Examiner* — Christopher M Brandt (57) ABSTRACT

The present invention relates to method and arrangements to provide information related to user devices in a telecommunication system (TS). The system comprises at least one network domain (HPLMN, WCDMA) that is associated with a central database (DCR). The method comprises identification in the central database (DCR) of a first request (REQ1, REQI1) to provide to at least one data analysis function, user identity information related to all user devices that notifies attachment to the at least one network domain (HPLMN, WCDMA). Attachment notification from a requested user device (A, B) to the network domain is then detected in the central database.

18 Claims, 6 Drawing Sheets

SYSTEM AND METHOD FOR LAWFUL INTERCEPTION OF USER INFORMATION

FIELD OF INVENTION

The present invention relates to methods and arrangements to provide user identities and service capabilities for lawful interception purposes from users in a telecommunication system to a data analysis function.

BACKGROUND

The timely production and analysis of subscriber information and traffic data has become invaluable to service providers and government authorities for an array of needs related to critical infrastructure protection and the extraction of forensic evidence for law enforcement, for example for the purpose of prevention, investigation, detection and prosecution of crime and criminal offences including terrorism. When a new mobile unit is introduced into a mobile communication system, the mobile unit as such typically first has to be configured and the subscriber directories of an operator, to which a user of the mobile unit has a subscription, has to be updated before the user actually may employ these services. In order to configure the mobile unit, some data or software is typically downloaded and installed or activated in the mobile unit. In addition, the operator's subscriber directories are updated, identifying the mobile unit as capable of supporting and managing the service(s). In the international application WO 2004/040929 is disclosed a network-based Automated Device Configuration ADC solution. The system in the international application detects what kind of phone a user has. Technically it means that when the phone is activated, the network matches the International Mobile Equipment Identifier Software Version, IMEISV of the mobile phone with information in previously stored data for that subscriber, identified by International Mobile Subscriber Identifier, IMSI. If the IMEISV value for that IMSI has changed or was not previously registered, a configuration and provisioning event is triggered. The implementation is based on appropriate network triggering options for the proper ADC adaptations in GSM, GPRS and WCDMA network domains. The triggering options include an SGSN based trigger and an MSC/HLR based trigger. In the international patent application, Automatic Device Detection ADD functionality is used. The ADD requires a Device Configuration Register DCR that interacts with SGSN and MSC/HLR nodes as well as a DMS node. Independent of trigger option, a network trigger event such as a subscriber attachment notification, is transferred to the Device Configuration Register DCR that may decide if device configuration is needed. If a subscriber buys a new mobile phone or changes GPRS subscription for example adding new Access Point to Networks, the DCR will upon receiving a subscriber attachment notification, detect the new phone, check the need for configuration, and order to DMS the sending of appropriate configuration to the device, if found appropriate. New configuration parameters are sent to a subscriber's device via SMS using Over-The-Air protocol.

The ADD manages the network detection of new user devices and the detection of new subscribed Access Point to Network APN. The ADD may verify any APN the user can set on his phone. As example, the ADD shall verify either that all useful configuration parameters have been set or that some other additional APNs can be downloaded on the phone since supported by the GPRS user subscription in HLR. It offers two modes of operations that reflect the following detection-triggering capabilities:

MSC/HLR Triggering (MT)
SGSN Triggering (ST)

Depending on the selected mode of operation, the DCR interacts with either or both of SGSN (that is ADC-ST mode) or MSC & HLR nodes (that is ADC-MT mode). The MT mode of operation supports the detection of a new device whenever a subscriber attaches to the network (i.e. MSC/HLR location update procedure), the ordering of device configuration related to communication settings (that is bootstrap) and service application configuration update. If both Home and Visited Public Land Mobile Network HPLMN and VPLMN support the ADC-MT solution, the detection of new user devices is supported even when the subscriber is in roaming condition. The use of the ADC solution with ADC-ST mode of operation is limited to GPRS in HPLM environment, without roaming support.

Figure 2:
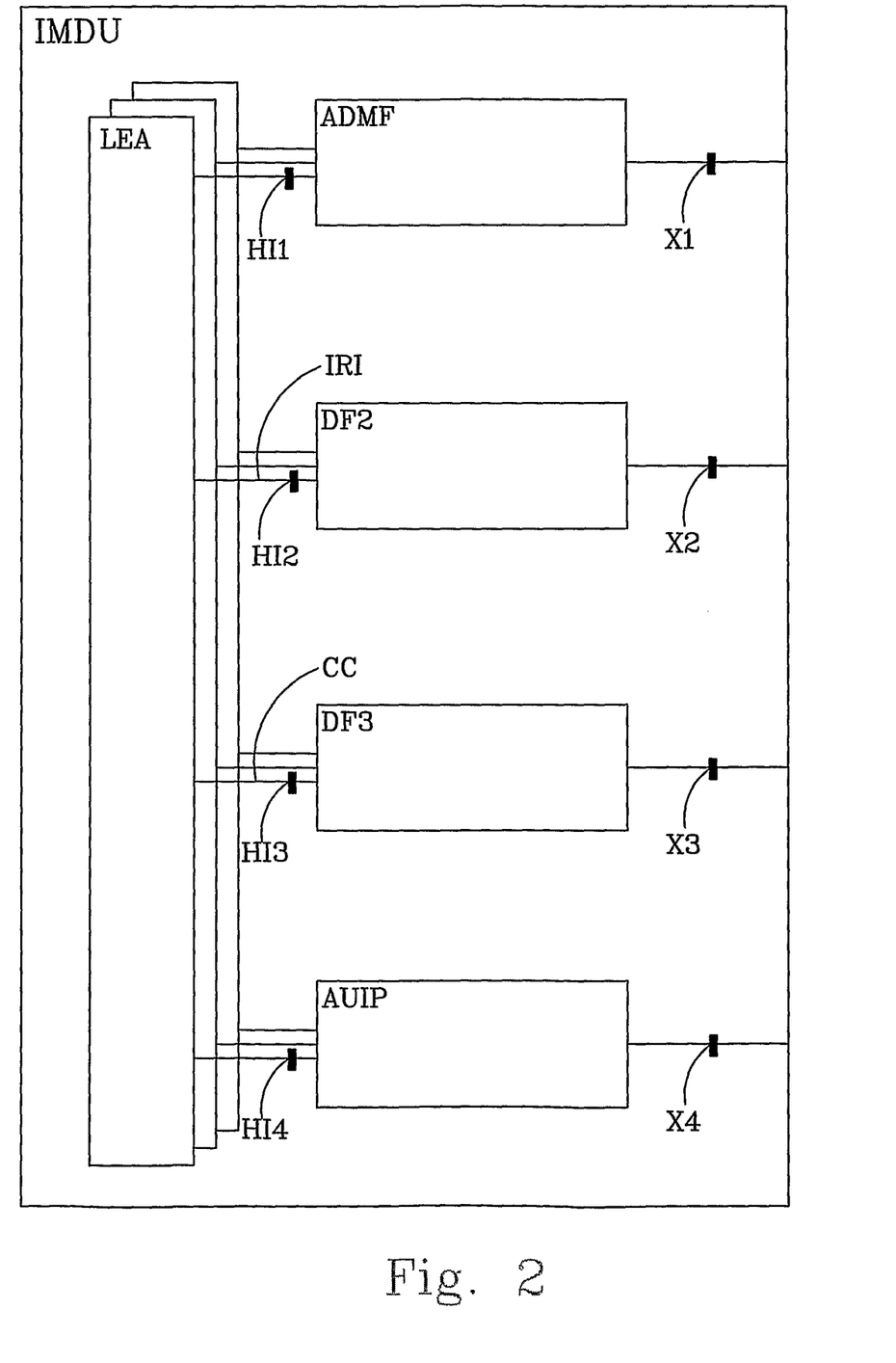
FIG. 2 discloses a block schematic illustration of an Intercept Mediation and Delivery Unit according to the invention.

The increasing need for and use of this information and data has increased the burdens and costs on service providers and law enforcement alike. Monitoring can be used to provide information from users. An Intercept Mediation and Delivery Unit IMDU belong to prior art and are disclosed in current Lawful Interception standards (see 3GPP TS 33.108 and 3GPP TS 33.107-Release 6). The IMDU comprises a Law Enforcement Monitoring Function LEMF. The LEMF is connected to three Mediation Functions respectively for ADMF, DF2, DF3 i.e. an Administration Function ADMF and two Delivery Functions DF2 and DF3. The Administration Function and the Delivery Function DF2 are each one connected to the LEMF via standardized interfaces H1 and H2, and connected to an intercept access point via the interfaces X1 and X2. The messages sent from LEMF to ADMF via HI1 and from the ADMF to the network via the X1 interface comprise identities of a target that is to be monitored. The Delivery Function DF2 receives Intercept Related Information IRI from the network via the X2 interface, and DF2 is used to distribute the IRI to relevant Law Enforcement Agencies via the HI2 interface. The DF3 receives Content of Communication, i.e. speech and data and is connected to LEMF via a standardized interface HI3 and to the access point via an interface X3. Commonly the ADMF, DF2 and DF3 are parts of the service provider domain and located distinctly from the LEMF. The Intercept Mediation and Delivery Unit will be further mentioned in the description when FIG. 2 is explained.

In the currently provided lawful interception solution, it is a prerequisite that the lawful interception agencies know the identities of the user to intercept. In a certain country, this can be achieved by contacting the network operators providing telecommunication services and the agencies will get the user identities from those operators. A problem arises when foreign mobile users enters a certain country and performs roaming procedure in a certain network operator domain. Another problem is related to the correlation of user identities e.g. IMEI and IMSI. The agency does for example not know that a certain subscriber uses a certain IMSI with certain mobile equipment IMEI and it is not possible to activate interception on IMEI in GPRS. Besides, the agencies can be informed about the subscriber profiles (i.e. enabled services) from network operators, but it cannot be informed about the real usage of the service from the subscribers. This information from both home and foreign users could be useful for the agency to decide preliminarily if the user has to be intercepted. Typical example is related to "hackers", who are not dangerous if provided only with "speech" service subscriptions, while the interception is really necessary when the subscriber access to data call or packet switched services.

SUMMARY OF INVENTION

A prerequisite in current lawful interception solutions is that an agency knows the identity of the user to intercept. A problem arises when an unknown user like a user from a foreign country enters a network domain. The present invention solves problems related to identification of subscribers which notify attachment to a network domain, for example from the foreign country.

The problems are solved by the invention by requesting information from subscribers that notifies network attachment and potentially also fulfill further defined triggering criteria. A central database, in which subscribers' attachment is registered, is used as access point for monitoring, and upon fulfilled triggering events, requested information is provided to at least one data analysis function.

The solution to the problems more in detail comprises a method to provide information related to user devices in a telecommunication system. The telecommunication system comprises at least one network domain associated with a central database. The method comprises the receiving to the central database of a request to provide identity information related to all user devices that notifies attachment to the at least one network domain and potentially also fulfill further defined triggering criterion. An attachment notification from a requested user device is identified in the central database and automatically or upon request, information related to the detected user device is sent from the central database to at least one data analysis function.

Thus, the object of the invention is to identify subscribers that notify attachment to a network domain. The above mentioned object and others are achieved by methods, arrangements, systems and articles of manufacture.

Advantages with the invention are that it provides an enhanced Lawful Interception solution with the added value to assist the agencies in the detection and provision of user identities and other user information (interception target specification), preliminary to the start of interception. With this new functionality, the agency can activate an interception on a particular identity for a certain service only upon reception of information that the service is really used (e.g. each user can have more than one e-mail address, but really most of them are not used at all). This will result in an optimized use of the mediation function capabilities for interception target management. The invention introduces a generic mechanism to detect user identities and capabilities, which could be meaningful for Lawful Interception purposes, covering any type of network services and any type of user identities, in a network scenario of continuously increasing number of provided telecommunication services and consequent increasing of complexity of user identification for interception purposes. The remarkable value of the proposal can be deduced considering all the possible user identities (e-mail addresses, SIP URI, MMS nick name, etc.) being added to the traditional target types (IMEI, IMSI, MSISDN) and the correlation operated by a specific new function in the proposed enhanced LI solution architecture. With the very high risk of terrorist attacks in some countries performed by people coming from well identified countries, it could be required to detect every new roamers entering in risky countries from other specific foreign countries. With this solution it is possible to have such kind of detection, both in case of successful and failed roaming, by means of proper filtering criteria based on IMSI. The new enhanced LI architectures introduced a standardized provisioning of traffic related information for any service subscription or users in HPLNM and VPLNM on a real-time communication channel (HI4 interface), which allows also automatic start of interceptions for specific target users matching the detection criteria.

The invention will now be described more in detail with the aid of preferred embodiments in connection with the enclosed drawings.

DETAILED DESCRIPTION OF THE INVENTION

When a user device/equipment enters a network domain or when users purchase and activate new user equipment, e.g. a mobile phone or other mobile unit, capable of supporting an enhanced service, e.g. MMS messaging, that user equipment first has to be configured for the enhanced service before being able to use the service. In addition, the communication system has to provision the user equipment, typically, by updating an operator's directory or register, identifying the user equipment as capable of and configured for the enhanced service.

Figure 1:
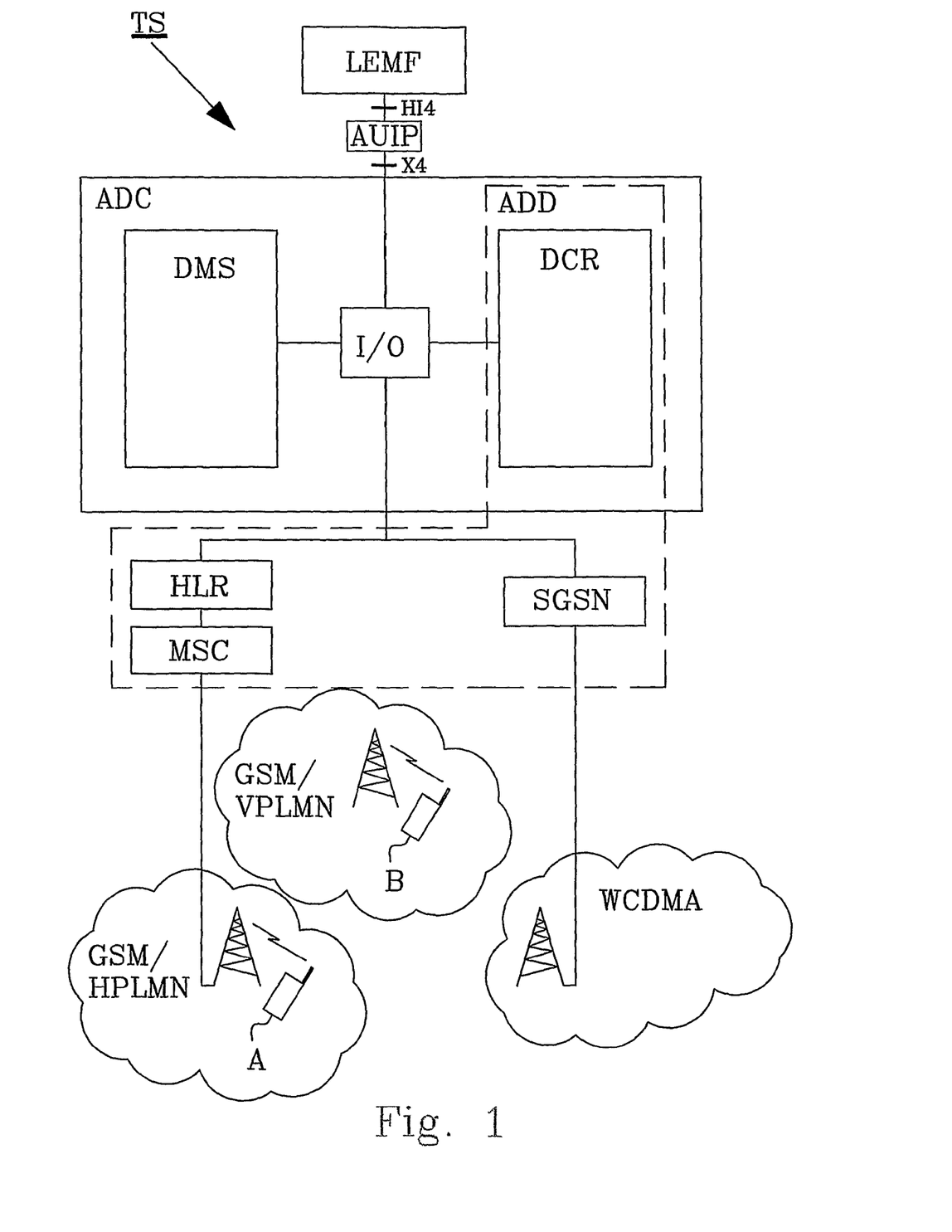
FIG. 1 discloses a block schematic illustration of a network-based solution according to the invention.

FIG. 1 discloses in a block schematic illustration a network-based Automatic Device Configuration ADC solution. The ADC comprises a Device Configuration Registers DCR that is a central database and a Device Management System DMS. When non-provisioned enhanced-service capable user equipment is introduced into the system, the DCR detects the new device, check the need for configuration, and order to the DMS the sending of appropriate configuration to the device. New configuration parameters are sent to a subscriber's device via SMS using Over-The-Air protocol. A GSM Network as well as a WCDMA network is disclosed in FIG. 1. The GSM network is attached via a Mobile Service Switching Centre MSC and a Home Location Register HLR to an Input/Output unit I/O in the ADC. The WCDMA network is attached to the I/O via a Serving GPRS Support Node SGSN. Both the DCR and the DMS are attached to the I/O unit. A mobile subscriber A is located in GSM/HPLMN and a mobile subscriber B is located in GSM/VPLMN. A Law Enforcement Monitoring Facility LEMF is attached to the I/O unit via an Automatic User Information Provision AUIP. The LEMF communicates over interfaces HI4 and X4. The LEMF and AUIP are part of an Intercept Mediation and Delivery Unit. To be noted is that the Automatic Device Configuration ADC is not a prerequisite for the claimed invention. Other types of central databases can be used. The network operator could adopt a dedicated ADD system for the inter-working with Intercept Mediation and Delivery Unit, and is not obliged to include the Device Management System DMS.

The Intercept Mediation and Delivery Unit IMDU is disclosed in FIG. 2. Parts of the IMDU have already been explained in the "BACKGROUND" part of the application. The Automatic User Information Provisioning Function AUIP is now added to the Mediation Function. The X4 and HI4 interfaces are separated from the, in prior art, existing X1-3 and HI1-HI3 interfaces because the latter ones refer to targets of interceptions while the first ones X4/HI4 refers to users accessing the network on the basis of specified AUIP triggers, that only potentially can be of interest for a subsequent start of interception on the network. On the HI4 interface the LEMF can order the automatic detection of users with certain triggering criteria e.g. users roaming from a certain foreign country. On the X4 interface the order is then forwarded to the DCR. The DCR receives all user identities from network elements i.e. MSC, HLR, SGSN in this example and, when a user identity is detected by DCR, matching a given triggering criteria (for example users roaming from a certain country), the DCR notifies the detected identities to AUIP on the X4 interface. Delivery of the detected identities may be provided to all agencies which required them. The X4 and HI4 interface can foresee two ways of operations:

Push: the agencies is notified of any new user identity and capability, as soon as they are detected and matching with the triggering criteria previously specified by the agency.

Pull: the agencies request the retrieval of information from the database if the information is already available in the database.

Two kinds of triggering events, requested on the X4/HI4 interface, exist and need to be distinguished between:

1. Network Triggering events/NT-events. These events occur between the network elements for example MSC, HLR and SGSN, and the Device Configuration Registers DCR. The events are generic and can be used for both IMDU-related purposes and Automatic Device Configuration purposes. An example of a node triggering event is when a user device notifies attachment to a network domain. DCR will get identities in the following different cases from different exemplified network elements:

HLR: GSM/WCDMA identities detection of home users when in the HPLMN as well as when roaming in VPLMN;

HSS: IMS identities detection of home users when in the HPLMN as well as when roaming in VPLMN;

MSC/SGSN/CSCF: GSM/WCDMA/IMS identities detection of roamers as well as of home users;

Accordingly beyond the earlier, in "background", mentioned modes of operations that reflect MSC/HLR Triggering (MT) and SGSN Triggering (ST), other modes like for example IMS Triggering (IT) based on Home Subscriber Server HSS and Call Session Control Function CSCF are possible within the scope of the invention. The proposed LI AUIP solution is not necessarily limited to these above mentioned cases, i.e. the type of identities provided in the solution are dependent on national options and can be extended by adding new network elements or new identities in existing network elements.

2. Lawful Interception Triggering events/LIT-events. The events are used for Lawful Interception purposes. The request for these events is in this example sent from the LEMF to the DCR. By this request, the logic to filter the received data and build the required information is implemented. For example, a Mobile Country Code can be defined in the request and when received from the AUIP to the DCR, information related to user devices that notifies attachment to the network domain (NT-event) and have a country of domicile corresponding to the Mobile Country Code (LIT-event) is provided to the AUIP. Another example of a requested LIT-event is a specific service that is defined in the request and when received to the DCR, service information related to user devices that notifies attachment to the network domain are provided only if the user devices have activated the specific service.

Any possible LIT-events can be ordered by the LEMF based on the generic NT-events in the node elements. The LIT-events are only set in the DCR and the node elements shall not contain any LI triggering logic, but just generic user device detection logic.

Figure 3:
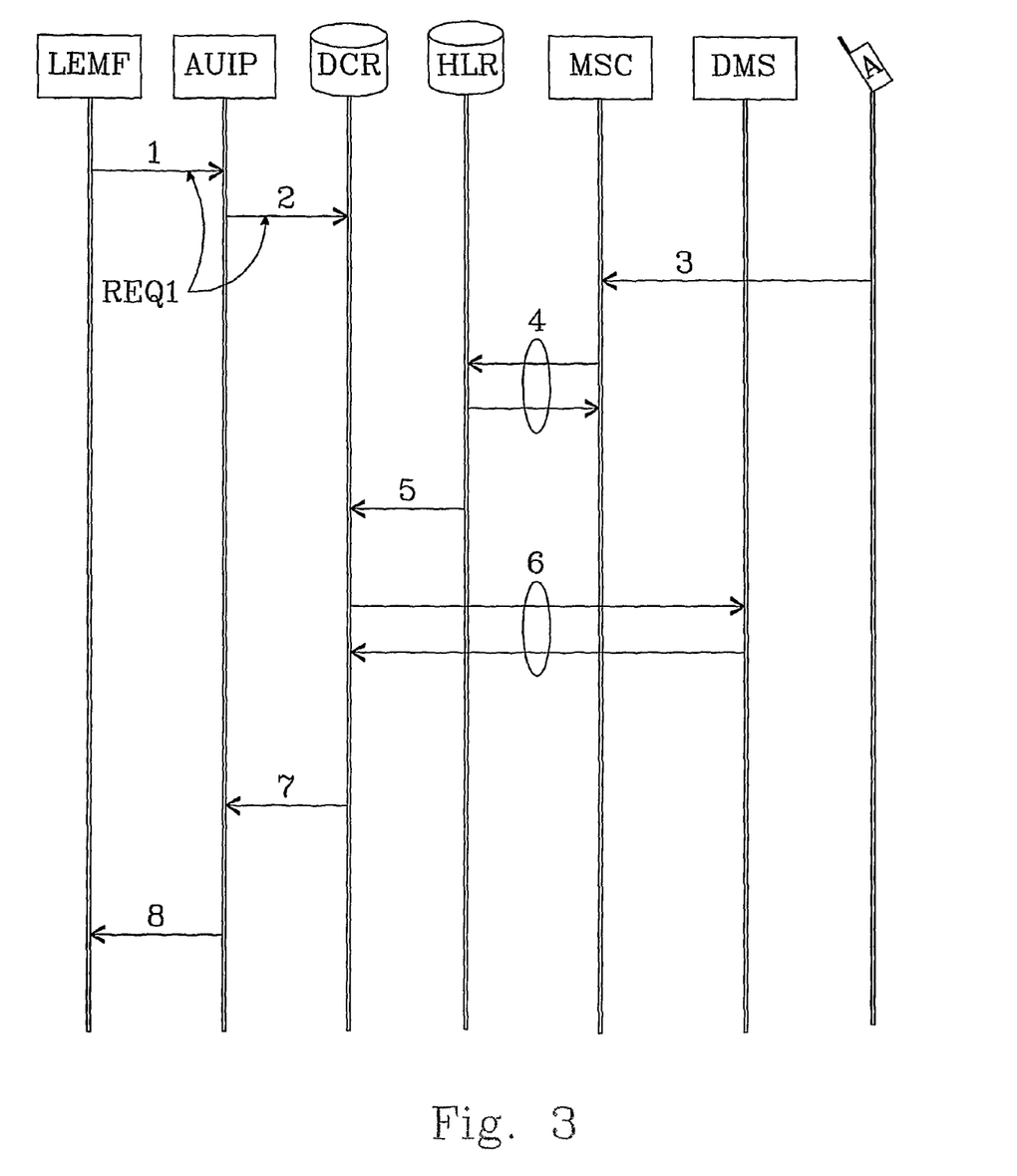
FIG. 3 discloses a signal sequence diagram according to the invention when a user device from a foreign country notifies attachment to a network domain.

FIG. 3 discloses a method according to a first embodiment of the invention. The different entities LEMF, AUIP, DCR, HLR, MSC, DMS and A in the figure correspond to the ones that already have been disclosed in FIG. 2. The Sequence diagram in FIG. 3 shows detection of a user device A that is registered as domiciled in a foreign country X. The user device A is in this example activated in the public land mobile network GSM to which the DCR is associated. The activation is for example caused by turning on the device A in the GSM network or when the device roams into the GSM network (the embodiment applies both to the case of successful an unsuccessful roaming procedures). The method according to this first embodiment comprises the following steps:

A first request REQ1 to provide, as soon as available (push mode), identity information related all to user devices domiciled in the foreign country X (LIT-event) that notifies attachment to the GSM network (NT-event), is sent 1, 2 from the LEMF to the DCR via the AUIP. The request REQ1 comprises a Mobile Country Code MCC corresponding to a foreign country which in this example is the domicile of the user device A, i.e. country X. The requested NT-event and LIT-event are both stored in the DCR. Generally, the request stems from a search warrant or other authorization from a government or other authorized institution. In this example the request REQ1 is sent from the LEMF but the request may also be communicated by an intermediary, such as a human operator who receives the command from an authorized source, and then inputs the command to the DCR. To be noted is that the control is in the AUIP function, that has to be initiated for the successive mediation and delivery of user identities information.

The user device A is activated in the GSM network and an attachment notification 3 is received to the MSC from the user device A.

A location update procedure according to GSM specifications is executed 4 between the MSC and the HLR.

Information about the new detected user A is sent 5 from the HLR to the DCR for user configuration update purposes, for both IMDU/LI purposes and ADC purposes.

Since a new user has been identified in the DCR, a configuration order with appropriate data is sent from the DCR to the DMS and a user configuration update procedure is executed 6. DCR stores the received user information. DCR checks if the received user configuration information corresponds to any requested LIT-event received from the LEMF. In this example no such corresponding event was found in the configuration update procedure. An example of such LIT-trigger event is if the LEMF would have requested identity information related to user devices with a specified service activated and which service was found in the update procedure to be activated for the user device A. In case of an already existing subscriber was detected, the network matches the International Mobile Equipment Identifier Software version IMEISV of the users' mobile phone with information in previously stored data for that subscriber, identified by International Mobile Subscriber Identifier IMSI. If the IMEISV value for that IMSI has changed or was not previously registered a configuration and provision event is triggered. To be noted is that this example relates to the ADC function that is optional. The network operator may instead have a dedicated ADD system for the interworking with AUIP function.

The LIT-event "provide identity information related to user devices domiciled in country X" has been received from the LEMF and stored in DCR. This requested event corresponds to the user device A. The device Configuration Register DCR establishes that the Mobile Country Code MCC of the user device A is equal to the one requested.

The identity of the new detected international roaming user device A is sent 7 from the DCR to the Automatic User Information Provision AUIP over the interface X4.

The identity of the new detected international roaming user device A is sent 8 from the AUIP to the Law Enforcement Monitoring Facility LEMF over the interface HI4.

As an alternative to the above example the request instead could comprise a request to provide identity information related to all devises (home and foreign) that notifies attachment to the GSM network.

Figure 4:
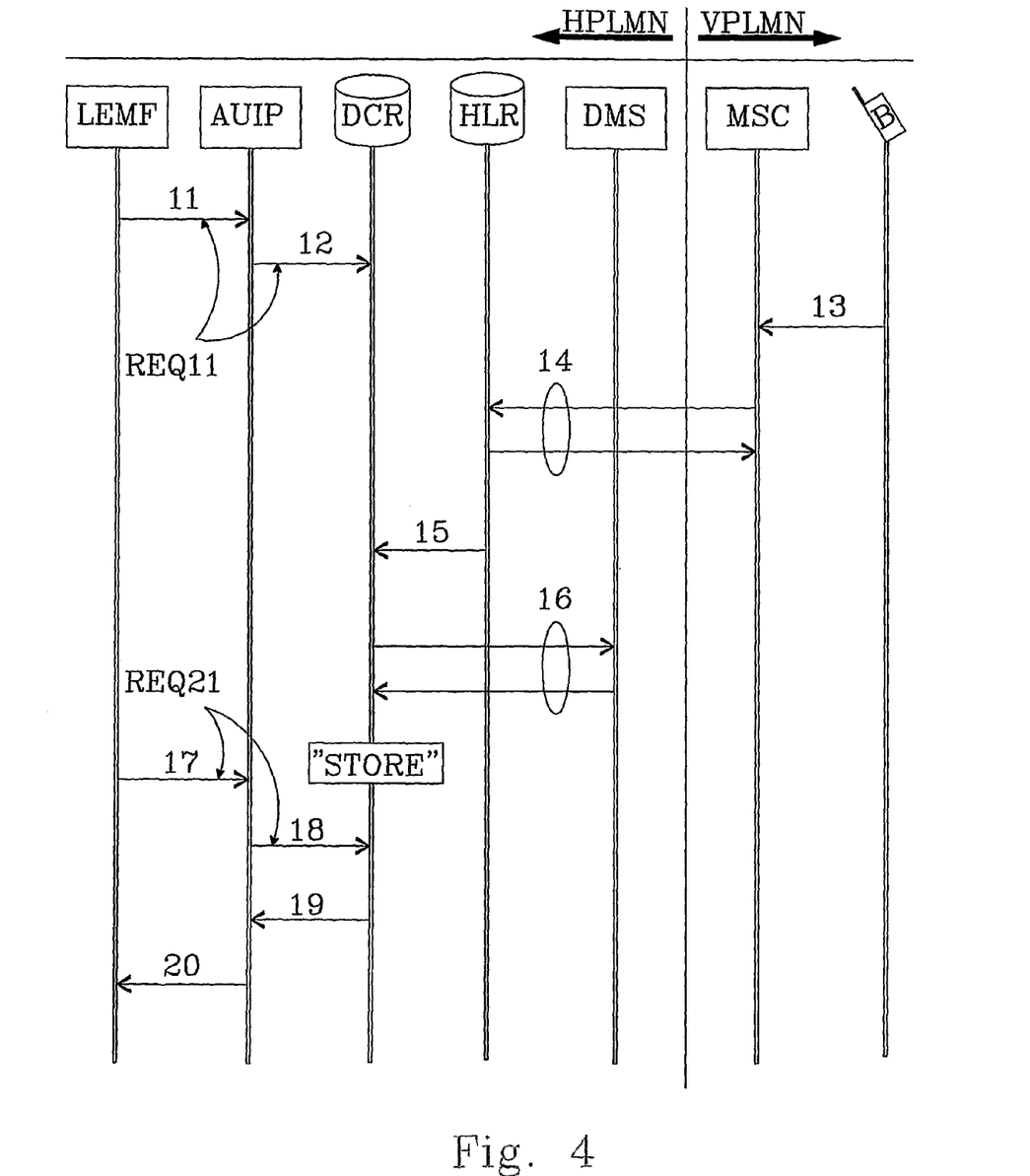
FIG. 4 discloses a signal sequence diagram according to the invention when a user domiciled in a Home Public Land Mobile Network is roaming in a Visited Public Land Mobile Network and notifies attachment to the home network.

FIG. 4 discloses a method according to a second embodiment of the invention. The entities LEMF, AUIP, DCR, HLR, DMS, MSC and B in the figure correspond to the ones already disclosed in FIG. 2. The Sequence diagram in FIG. 4 shows detection of a user device B. The user device B is registered as domiciled in the Home Public Land Mobile Network GSM/HPLMN to which the DCR is associated. The device B is in this example roaming in the Visited Public Land Mobile Network GSM/VPLMN. The method according to this second embodiment of the invention comprises the following steps:

A first request REQ11 to store and later potentially provide identity information related to user devices that notifies attachment (NT-event) to the GSM network HPLMN (also when roaming in VPLMN), is sent 11, 12 from the LEMF to the DCR via the AUIP. The request REQ11 also comprises a service identification MMS (LIT-event). In this example the LIT-event "provide identity information related to user devices that have activated the service MMS" is received from the LEMF.

The user device B is activated in the GSM/VPLMN network and an attachment notification 13 is received to the MSC in VPLMN from the user device B.

A location update procedure is executed 14 between the MSC in VPLMN and the HLR in HPLMN.

Information about the new detected user B is sent 15 from the HLR to the DCR, both located in HPLMN, for user configuration update purposes.

Since a new user has been identified in the DCR, a configuration order with appropriate data is sent from the DCR to the DMS and a user configuration update procedure is executed 16. DCR checks if the received user information corresponds with any requested and stored NT/LIT-event.

The service MMS was found in the update procedure to be activated for the user device B.

Received user information, i.e. identity of the attached user device B together with information of the MMS activation, is stored in the DCR "STORE".

A second request REQ 21 to provide identity information related to all in the DCR stored user devices that have notified attachment to the GSM network HPLMN (also when roaming in VPLMN) and that have activated the MMS service, is sent 17, 18 from the LEMF to the DCR via the AUIP. To be noted is that this request as well might be sent from another agency than the one that sent the first request REQ11.

The identities of all, in the DCR stored user devices that fulfill the second request, are sent 19 from the DCR to the Automatic User Information Provision AUIP. The identity of the user device B is consequently sent from DCR to AUIP.

The identity of the user device B is forwarded 20 from the AUIP to the Law Enforcement Monitoring Facility LEMF.

Figure 5:
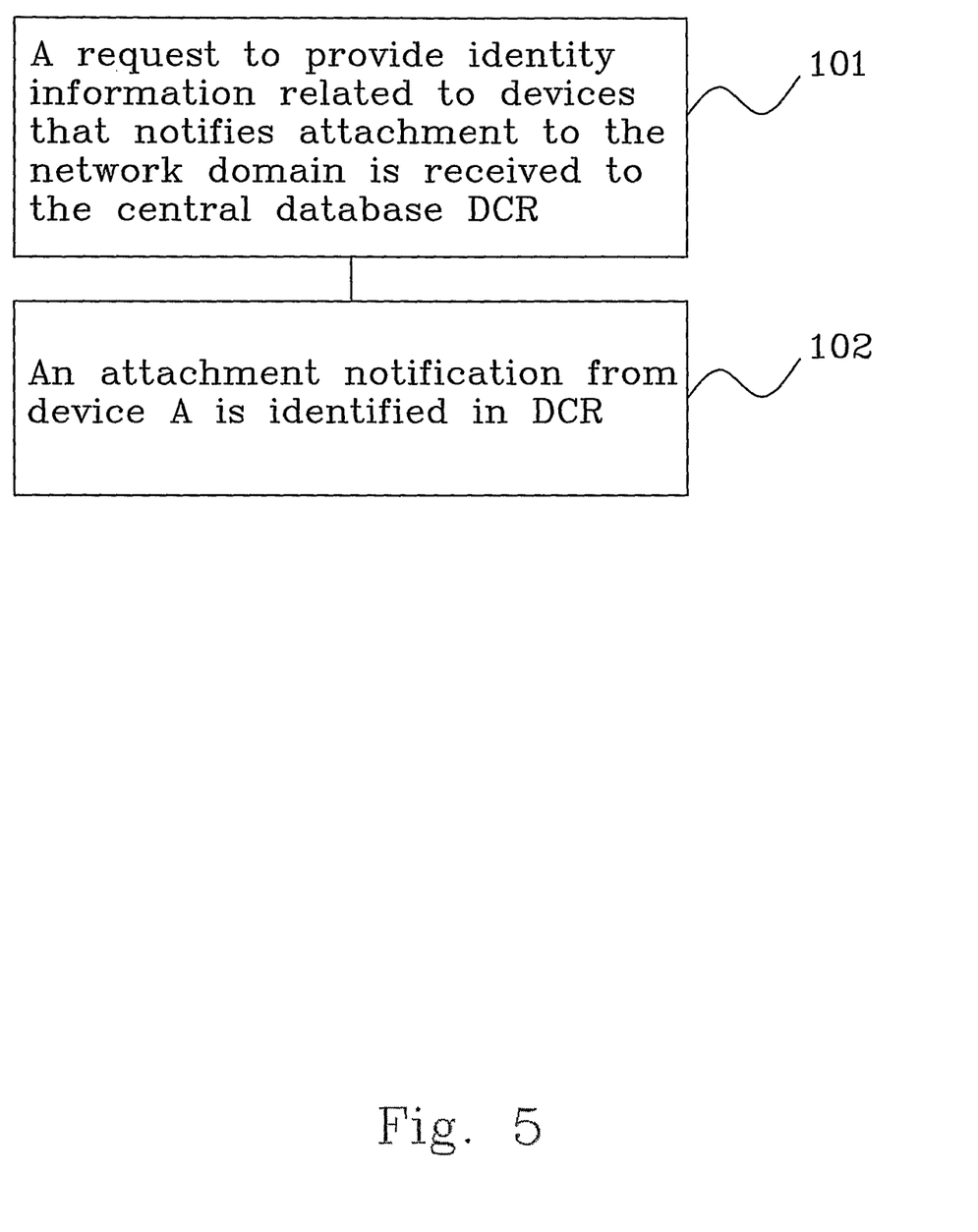
FIG. 5 shows a flow chart illustrating some essential method steps of the invention.

FIG. 5 discloses a flowchart in which some important steps are show. The flowchart is to be read together with the earlier shown figures. The flowchart comprises the following steps:

The first request REQ1 to provide identity information related to user devices that notifies attachment to the HPLMN, is received to the DCR. A block 101 discloses this step in FIG. 5.

An attachment notification from a requested user device A is identified in the central database DCR. A block 102 discloses this step in FIG. 5.

In case the agency is interested in automatic detection of users, which signal their presence for the first time (new subscriptions or new roamers) in the network, relating to a given time instant or within a given time period (the agency obtains this information in real-time as soon as a new user enters in the network). With this mechanism, the agency could e.g. determine all users that entered a certain country in a certain time period. In this case, as an extension to the above embodiments, the request REQ1 also comprises a Time Period Value TPV1 that indicates a specified time period. Users that notify attachment (NT-event) to the network during the specified time period (LIT-event) are hereby of interest to detect. As an example, the agency can order the interception of user devices from a specified country if the users entered the last day.

Other examples of requested LIT-events are:
All new home subscribers in a given time period.
All home users roaming to a VPLMN in a given country supporting the ADC solution (see embodiment 2).
All new users with MSISDN and/or IMSI within a specified list or range of identities.

As a result of a triggering event, all user identities for given subscribers can be provided to the agency by the DCR which has the logic to correlate all identities provided by the node elements. Each identity provided to the agencies by the telecommunication/service provider operator is not correlated to each other (especially in multi-vendor service networks, where each service operator is unable to provide any sort of correlation with the identities provided by other operators, because of the end-to-end nature of new services), as it is not possible to determine when different identities refer to the same physical subject. A simple example of identities that cannot be correlated by the network operator is the IMEI and the IMSI/MSISDN, which can be determined to be referring to the same subject only if they are under interception. Currently the LI agency can receive from telecommunication/service provider operator all subscriber profiles, which include the different identities potentially usable for the different subscribed network services. The result is a number of identities, in some cases large and in others not used for traffic at all. Instead, the new proposed identity detection is based on real user traffic activity in the network (not on the user subscription profile), so the information provided to the agency refers to the actual service usage by the user. The information about the actual usage of a certain service could be useful for the agency to decide preliminarily when the user has to be intercepted/monitored. With this functionality, the agency can verify the correct behavior of the interception function, by double-checking the reception of interception information for given targets with the indication received by means of the AUIP notifications on the real usage of the service. The new proposal introduces a register based solution to collect in the DCR all information about the user in terms of different identities used for his service capabilities. As the database is updated continuously according to the actual activity of the user, it is possible to provide the correlation among the identities (e.g. IMSI/MSISDN used with a certain IMEI in WCDMA/GSM calls; MSISDN and Nick name used for MMS or internet browsing). Any kind of different subscriber and traffic information can be preserved in the operator/service provider network and so retrieved on demand. The DCR provides register functions to collect all possible user identities available in the network correlated to each subject, when allowed by the telecommunication service. For example, DCR will collect MSIDN, IMSI and IMEI provided by the MSC, and will register them as referring to the same subject. E.g. the agency knows the IMEI of a user but it is not possible to activate interception on IMEI in GPRS. With this mechanism it is possible to correlate the known IMEI with the used IMSI and then activate the interception on GPRS. Of course, the updating of the DCR database (or other central database) depends on the ADD policy regulating the notifications with the user service identities and capabilities from the network elements towards the DCR (e.g. the notification could occur only at the first service access).

Additionally, beyond identity requests also subscriber service capabilities can be requested on the X4/HI4-interface. Knowledge of the real usage of the service from the subscribers from both home and foreign users could be useful for the agency to decide preliminarily if the user has to be intercepted. For example, the agency orders the detection for a user, of any new service activation (e.g. identified by any new configured APN on the user terminal, like an IPMM or MMS enabling APN). DCR will be able to provide the AUIP with the new service activation together with the new identities associated to the service (e.g. the IPMM private and public identities or the MMS access user name). On the basis of the detected service information, consequently, the agency can order the interception of the same user (possibly already under interception) by means of the new determined identities. As a further example of an extension of the embodiments, the request REQ1 may comprise also a Service Time Period Value STPV that specifies a time period during which the user has activated, for example the service MMS. In this case only devices that notify attachment to the network and have activated the MMS service during the specified time period are detected. Another example of an additional LIT-event is "all new subscribers that have used certain services in a given time period. To be noted is that the above mentioned LIT-events just are examples of a manifold of possible LIT-events that can be used as logic to filter the NT-event.

Figure 6:
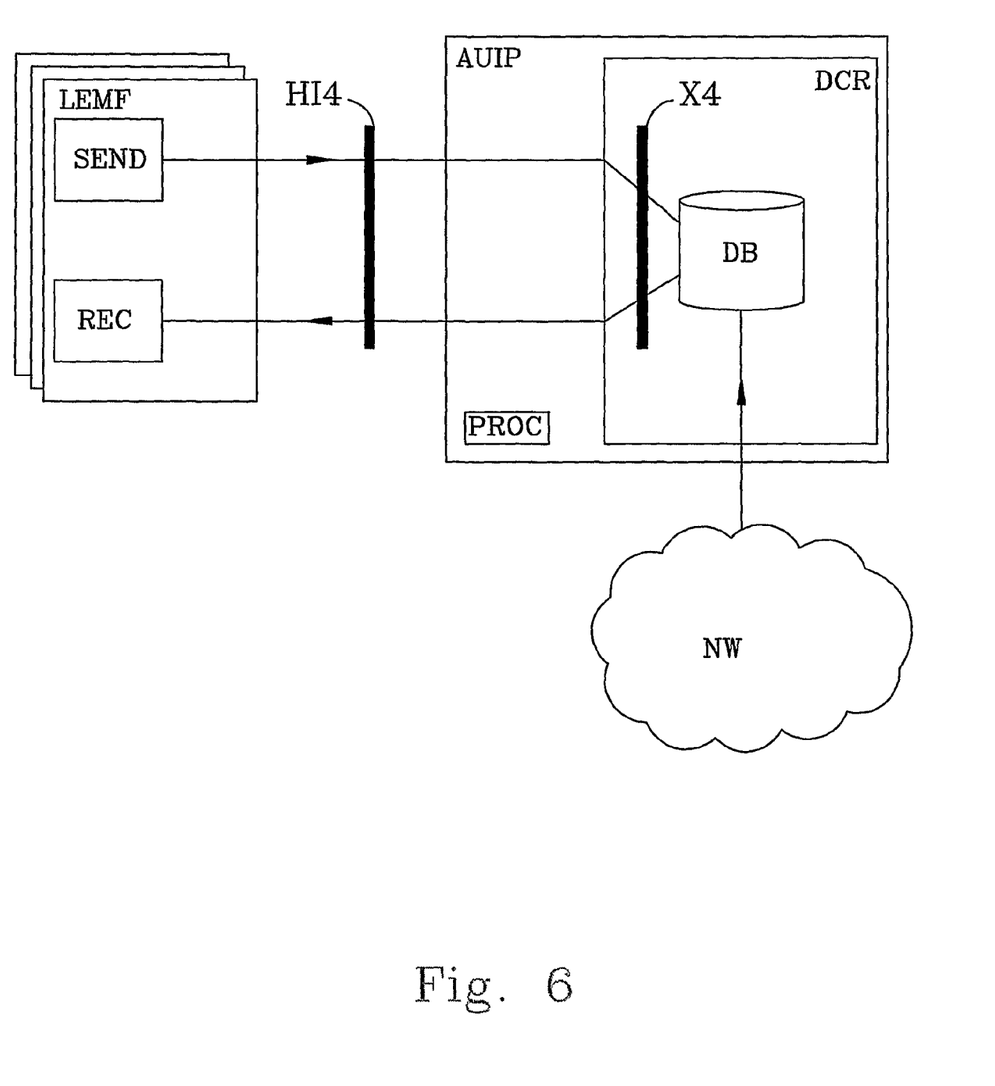
FIG. 6 shows a block schematic illustration of a system according to the invention.

A system that can be used to put the invention into practice is schematically shown in FIG. 6. The Automatic User Information Provisioning function AUIP is part of a regional mediation function node used to convert information from the LEMF, information that is received on the handover interface HI4 to the AUIP, to a format suitable for the Device Configuration Register DCR, information that is sent on the X4 interface to the DCR. FIG. 6 discloses in this example the AUIP comprising a processor unit PROC connected (connections not shown) among others to a network NW and to a database DB in the DCR. The processor handles the control in the AUIP and sees to that successive mediation and delivery of user information takes place. The database is connected to the network NW and to at least one Law Enforcement Monitoring Facility LEMF comprising a sender unit SEND and a receiver unit REC. Information required from the database is received by the LEMF. Physically, the DCR node can be dedicated to the mediation function node (like in this example) or it could be separated from the AUIP and instead be located within the Automatic Device Detection ADD function (see FIG. 1) and used also for other purposes, like automatic management function.

In the figures enumerated items are shown as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented on any of the Third Generation Partnership Project (3GPP), European Telecommunications Standards Institute (ETSI), American National Standards Institute (ANSI) or other standard telecommunication network architecture, consistent with the Communications Assistance for Law Enforcement Act (CALEA), which is a United States law requiring telephone network architectures be designed to enable authorized electronic interception. To be stressed is that the Automatic Device Configuration ADC is not a prerequisite for the claimed invention, only ADD function within the reference ADC configuration is meaningful for the purposes of the invention. In fact, the network Operator could adopt a dedicated ADD system for the interworking with IMDU and he is not obliged to include the configuration system DMS. The access point to LEMF, i.e. the central database, might for example instead of the DCR be the MSC, HLR or SGSN. Instead of the Law Enforcement Monitoring Facility LEMF receiving identity and application information, another entity can be used for this such as any kind of data analysis function. The term "devices" that is used in the description and claims is a general term referring to for example devices/subscribers/users.

The invention claimed is:

1. A method for providing information related to user devices in a telecommunications system, the method comprising:

receiving, in a Device Configuration Register, a first request to store user identity information related to a plurality of user devices, wherein
the Device Configuration Register communicates with a plurality of network domains,
the Device Configuration Register detects when a non-provisioned enhanced service capable user device is introduced into the system, and
each user device among the plurality of user devices (1) notifies attachment to at least one network domain among the plurality of network domains and (2) further fulfills a given criterion common to each user device among the plurality of user devices;

in response to receiving the first request, storing the user identity information related to the plurality of user devices;

detecting, in the Device Configuration Register, an attachment notification to the at least one network domain among the plurality of different network domains from a new user device that fulfills the given criterion common to each user device among the plurality of user devices;

storing, in the Device Configuration Register, user identity information related to the new user device;

receiving, in the Device Configuration Register, a second request to provide user identity information related to the plurality of user devices to at least one data analysis function;

in response to receiving the second request, identifying, in the Device Configuration Register, the user identity information related to the new user device; and sending, from the Device Configuration Register to the at least one data analysis function, the user identity information related to the new user device.

2. The method to provide information according to claim 1, which given criterion is a Mobile Country Code and whereby user devices having a country of domicile specified by the Mobile Country Code fulfill the criterion.

3. The method to provide information according to claim 1, which given criterion is a list of International Mobile Subscriber Identifier and whereby user devices specified in the list fulfill the criterion.

4. The method to provide information according to claim 1, which given criterion is a time period value and whereby user devises that notifies attachment to the network domain within the specified time period fulfill the criterion.

5. The method to provide information according to claim 1, which given criterion is service identification and whereby user devices that have activated the specified service fulfill the criterion.

6. The method to provide information according to claim 1, which method comprises the following further steps:
analyzing received information related to the new user device;
intercepting the new user device.

7. The method to provide information according to claim 6, which received information related to the new user device comprises at least one correlated alternative identity for the device and whereby the user device is identified for interception by the alternative user identity.

8. The method to provide information related to user devices in a telecommunication system according to claim 1, whereby communication between the Device Configuration Register and the data analysis function takes place over interfaces HI4/X4 that are separated from interfaces HI1-HI3/X1-3 specified in a Lawful Interception standards 3GPP TS 33.107-Release 6.

9. The method to provide information related to user devices in a telecommunication system according to claim 8 whereby the communication between the Device Configuration Register and the data analysis function takes place via an Automatic User Provision Function, which communication refers to all users accessing the network on the basis of specified triggers.

10. The method to provide information according to claim 1, wherein the new user device is located in another network domain than the at least one network domain.

11. The method to provide information according to claim 5, which criterion further is a service time period value and whereby user devices that have activated the service during the specified time period fulfill the criterion.

12. The method to provide information according to claim 5, which criterion further is a service time period value and whereby user devices that have used the service during the specified time period fulfill the criterion.

13. A method to provide information related to user devices in a telecommunication system according to claim 1 wherein the information is provided to at least one data analysis function via a Mediation Function node, which method comprises the following steps:
identifying in the Mediation Function node, the trigger specification that potentially can be used for a subsequent start of interception of a user;
forwarding the trigger specification to the Device Configuration Register;
receiving from the Device Configuration Register to the Mediation Function node, user identity information from a user that fulfils the trigger.

14. The method to provide information related to user devices in a telecommunication system according to claim 13, whereby the Device Configuration Register is physically separated from the Mediation Function node.

15. An arrangement to provide information related to user devices in a telecommunications system comprising:
at least one network domain;
a Device Configuration Register, associated with the at least one network domain, configured to communicate with a plurality of network domains and detect when a non-provisioned enhanced service capable user equipment is introduced into the system, wherein the Device Configuration Register is further configured to:
receive in the Device Configuration Register, a first request to store user identity information related to a plurality of user devices, wherein
each user device among the plurality of user devices (1) notifies attachment to at least one network domain among the plurality of network domains and (2) further fulfills a given criterion common to each new user device among the plurality of user devices,
store the user identity information related to the plurality of user devices, responsive to the first request,
detect an attachment notification to the at least one network domain among the plurality of different network domains from a new user device that fulfills the given criterion common to each user device among the plurality of user devices;
store, in the Device Configuration Register, user identity information related to the new user device;
receive a second request to provide user identity information related to the plurality of user devices to at least one data analysis function;
responsive to receiving the second request, identify, in the Device Configuration Register, the user identity information related to the new user device; and
send to the at least one data analysis function the user identity information related to the new user device.

16. The arrangement to provide information according to claim 15, which arrangement further comprises:
means for analyzing received information related to the new user device;
means for receiving to the Device Configuration Register, a request to intercept the new user device.

17. The arrangement to provide information related to user devices in a telecommunication system according to claim 15, wherein the information is provided to at least one data analysis function via a Mediation Function node, which arrangement comprises:

means for identifying in the Mediation Function node, the trigger specification that potentially can be used for a subsequent start of interception of a user;

means for forwarding the trigger specification to the Device Configuration Register;

means for receiving from the Device Configuration Register to the Mediation Function node, user identity information from a user that fulfils the trigger.

18. A non-transitory computer-readable storage medium having computer readable program code embodied therein, when executed by a processor, the computer readable program code is configured to:

receive, in a Device Configuration Register, a first request to store user identity information related to a plurality of user devices, wherein
- the Device Configuration Register communicates with a plurality of network domains,
- the Device Configuration Register detects when a non-provisioned enhanced service capable user device is introduced into the system, and
- each user device among the plurality of user devices (1) notifies attachment to at least one network domain among the plurality of network domains and (2) further fulfills a given criterion common to each user device among the plurality of user devices;

store the user identity information related to the plurality of user devices, responsive to the first request;

detect, in the Device Configuration Register, an attachment notification to the at least one network domain among the plurality of different network domains from a new user device that fulfills the given criterion common to each user device among the plurality of user devices;

store, in the Device Configuration Register, user identity information related to the new user device;

receive, in the Device Configuration Register, a second request to provide user identity information related to the plurality of user devices to at least one data analysis function;

in response to receiving the second request, identify, in the Device Configuration Register, the user identity information related to the new user device; and send, from the Device Configuration Register to the at least one data analysis function, the user identity information related to the new user device.

* * * * *

UNITED STATES PATENT AND TRADEMARK OFFICE
CERTIFICATE OF CORRECTION

PATENT NO.         : 8,478,227 B2                                        Page 1 of 1
APPLICATION NO.    : 12/158449
DATED              : July 2, 2013
INVENTOR(S)        : Imbimbo et al.

It is certified that error appears in the above-identified patent and that said Letters Patent is hereby corrected as shown below:

In the Specification

In Column 4, Line 2, delete "HPLNM and VPLNM" and insert -- HPLMN and VPLMN --, therefor.

In Column 7, Line 27, delete "devises" and insert -- devices --, therefor.

In Column 9, Line 24, delete "MSIDN," and insert -- MSISDN, --, therefor.

In the Claims

In Column 11, Line 31, in Claim 4, delete "devises" and insert -- devices --, therefor.

In Column 12, Line 5, in Claim 13, delete "A method" and insert -- The method --, therefor.

Signed and Sealed this
First Day of April, 2014

Michelle K. Lee
*Deputy Director of the United States Patent and Trademark Office*